Patented May 24, 1949

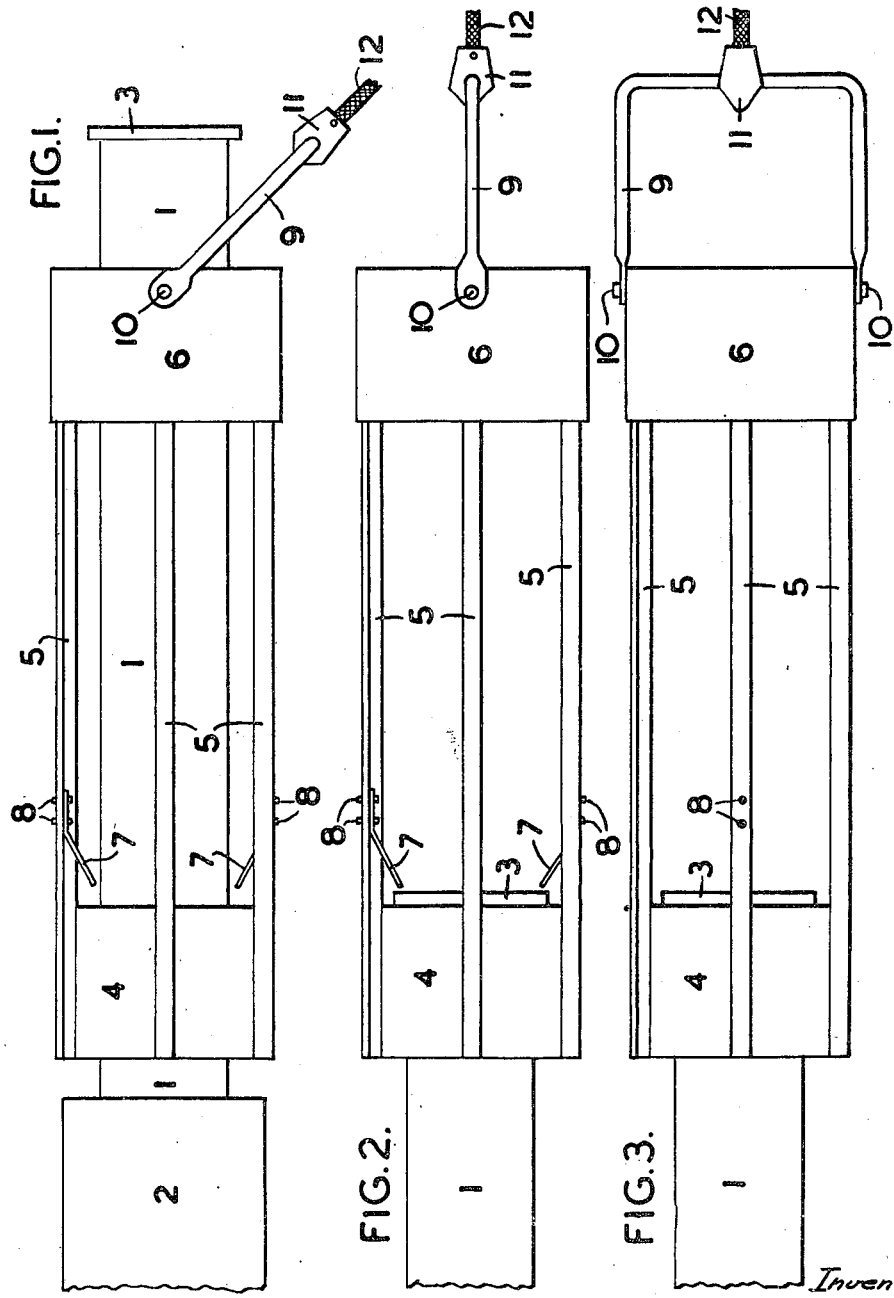

2,471,353

UNITED STATES PATENT OFFICE 2,471,353

LINE-CARRYING ROCKET

Conrad David Schermuly, Alfred James Schermuly, and Charles Schermuly, Parkgate, Newdigate, England Application September 4, 1946, Serial No. 694,682
In Great Britain July 17, 1946

3 Claims. (Cl. 102—89)

This invention relates to line-carrying rockets.

It is an object of the invention to provide a line-carrying rocket which is stable in flight. It is a further object of the invention to provide a line-carrying rocket which can be fired from a pistol or other discharger. Another object of the invention is the modification of a rocket having a sliding tail so that it becomes a line-carrying rocket.

According to this invention a line-carrying rocket comprises a rocket casing, a tail unit slidable on the rocket casing and a stirrup, to which a line can be attached, secured to said tail unit.

We prefer that the point or points of attachment of the stirrup to the sliding tail shall be near the rear end of the sliding tail and in such a position that interference with the stabilisation of the flight of the rocket is reduced to a minimum.

The sliding tail of a rocket usually comprises a number of fins secured at their rear ends to a cylindrical band, and a convenient method of securing the stirrup to such a sliding tail is by means of two rivets arranged at diametrically opposite points on said cylindrical band. The stirrup is preferably secured in such manner that it can pivot about the points of attachment so that the stirrup can be swung out of the axis of the rocket for insertion of the latter into a pistol or other discharger.

In the accompanying drawings, illustrative of the invention,

Figure 1 is a side elevation of a line-carrying rocket according to this invention in firing position, Figure 2 is a side elevation of the rocket of Figure 1 in flight position, and Figure 3 is a plan view of Figure 2.

Referring to the drawings, a rocket casing 1 containing the conventional rocket composition and choke, is provided with a head 2, which may be a simple wooden plug closing the front end of the casing or, as shown, may contain an illuminating composition. The rear end of the casing 1 is provided with a flange 3. Slidable on the rocket casing 1 is a tail unit comprising a cylindrical band 4 which is a sliding fit on the casing 1, four L-shaped bars 5 welded to the outside of the band 4, and a larger cylindrical band 6 to the inside of which the rear ends of the bars 5 are welded. One or more resilient strips 7 may be riveted at 8 to one or more of the bars 5 to act as locking means to prevent forward movement of the tail relatively to the casing 1 when the rocket is fired. In the form shown, two such strips 7 are provided, and when the rocket is fired, the casing 1 moves forward until the flange 3 strikes the band 4 when the tail is carried along by the rocket in the position shown in Figures 2 and 3. As the casing moves forward, the strips 7 ride over the flange 3 and spring back behind it as shown in Figure 2, thereby locking the tail in its flight position.

Rockets having sliding tails of this or similar kind are already known, and are described for example in our prior applications Serial No. 540,093, filed June 13, 1944, now United States Patent No. 2,409,904, and Serial No. 546,482, filed July 25, 1944, now United States Patent No. 2,437,211.

According to this invention a U-shaped stirrup 9 is pivoted by means of rivets 10 or the like adjacent the rear edge of the band 6. The stirrup 9 passes through a hole in a boss 11 within which is secured a wire strop 12 to which a line may be attached.

When the rocket is to be fired, a line is attached to the strop 12, the stirrup 9 is swung outwardly from the axis of the rocket, and the tail slid forward into the position shown in Figure 1. The rear end of the rocket is then inserted into the barrel of a pistol or other discharger so that the stirrup 9, the band 6 and the rear part of the bars 5 are outside the barrel. The rocket is fired from the pistol or discharger and ignited by conventional means, such as a cartridge. The rocket travels forward until the flange 3 strikes against the band 4 and then carries the tail unit with it, the stirrup swinging into the line of flight as shown in Figures 2 and 3. In this position of the stirrup, the stability in flight imparted to the rocket by the tail unit is not impaired by the stirrup or attached line, since the gases emerging from the choke end of the rocket tend to maintain the boss 11 in a central position.

While the stirrup has been herein described as attached to a tail unit comprising two bands 4, 6 and four bars 5, it will be understood that it may be similarly attached to any other type of sliding tail unit.

Furthermore, instead of the stirrup being pivoted at its front end, the front portion of the stirrup may be rigidly secured to the band 6 parallel to the axis of the tail unit, the rear portion of the stirrup being pivoted to the said front portion at a point intermediate the band 6 and the rear end of the stirrup.

While a specific embodiment of the invention has been described and illustrated, it is to be un-

What we claim is:

1. A line-carrying rocket comprising a casing, a band slidable on said casing, bars secured to said band and extending rearwardly thereof, a cylindrical band secured to the rear ends of said bars, said band, bars and cylindrical band constituting a sliding tail, and a stirrup, adapted for the attachment thereto of a line, secured to said cylindrical band.

2. A line-carrying rocket comprising a casing, a band slidable on said casing, bars secured to said band and extending rearwardly thereof, a cylindrical band secured to the rear ends of said bars, said band, bars and cylindrical band constituting a sliding tail, and a stirrup, adapted for the attachment thereto of a line, pivoted to said cylindrical band.

3. A line-carrying rocket comprising a casing, a band slidable on said casing, bars secured to said band and extending rearwardly thereof, a cylindrical band secured to the rear ends of said bars, said band, bars and cylindrical band constituting a sliding tail, a U-shaped stirrup pivoted to said cylindrical band at diametrically opposite points adjacent the rear edge thereof, a boss on said stirrup, and a wire strop secured to said boss.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
| --- | --- | --- |
| 196,019 | Hooper | Oct. 9, 1877 |
| 890,499 | Clough | June 9, 1908 |
| 1,110,507 | Myers | Sept. 15, 1914 |
| 2,210,820 | Schermuly et al. | Aug. 6, 1940 |
| 2,344,957 | Anzalone | Mar. 28, 1944 |

FOREIGN PATENTS

| Number | Country | Date |
| --- | --- | --- |
| 528,026 | Great Britain | Oct. 21, 1940 |